United States Patent
Hofmann et al.

(10) Patent No.: US 10,052,615 B2
(45) Date of Patent: Aug. 21, 2018

(54) OXYGEN STORAGE MATERIALS

(71) Applicant: UMICORE AG & CO. KG, Hanau-Wolfgang (DE)

(72) Inventors: Alexander Hofmann, Hanau (DE); Liesbet Jongen, Waechtersbach (DE); Daniel Herein, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/039,893

(22) PCT Filed: Nov. 25, 2014

(86) PCT No.: PCT/EP2014/075552
§ 371 (c)(1),
(2) Date: May 27, 2016

(87) PCT Pub. No.: WO2015/078864
PCT Pub. Date: Jun. 4, 2015

(65) Prior Publication Data
US 2017/0014810 A1    Jan. 19, 2017

(30) Foreign Application Priority Data
Nov. 29, 2013    (EP) .................... 13195132

(51) Int. Cl.
*B01J 21/00* (2006.01)
*B01J 23/20* (2006.01)
(Continued)

(52) U.S. Cl.
CPC ............ *B01J 23/898* (2013.01); *B01D 53/94* (2013.01); *B01D 53/944* (2013.01);
(Continued)

(58) Field of Classification Search
CPC ... B01J 23/20; B01J 23/22; B01J 23/28; B01J 23/30; B01J 23/34; B01J 23/38;
(Continued)

(56) References Cited

U.S. PATENT DOCUMENTS

| 4,711,870 A | 12/1987 | Yamada et al. |
| 5,045,521 A * | 9/1991 | Lox ...................... B01D 53/945 423/213.5 |

(Continued)

FOREIGN PATENT DOCUMENTS

| CN | 102281946 B | 12/2011 |
| EP | 0714692 A1 | 6/1996 |

(Continued)

OTHER PUBLICATIONS

International Preliminary Report on Patentability for International Application No. PCT/EP2014/075552 dated May 31, 2016, 6 pages.
(Continued)

*Primary Examiner* — Cam N. Nguyen
(74) *Attorney, Agent, or Firm* — Smith, Gambrell & Russell, LLP

(57) ABSTRACT

The present invention is concerned with oxygen storage materials. In particular an oxygen storage material (OSM) is proposed which comprises a certain mixed oxide as the oxygen storage component. The oxygen storage material can be used in conventional manner in three-way catalysts or NOx-storage catalysts for example.

7 Claims, 1 Drawing Sheet

(51) Int. Cl.
| | |
|---|---|
| B01J 23/22 | (2006.01) |
| B01J 23/28 | (2006.01) |
| B01J 23/30 | (2006.01) |
| B01J 23/34 | (2006.01) |
| B01J 23/38 | (2006.01) |
| B01J 23/40 | (2006.01) |
| B01J 23/42 | (2006.01) |
| B01J 23/44 | (2006.01) |
| B01J 23/48 | (2006.01) |
| B01J 23/50 | (2006.01) |
| B01J 23/52 | (2006.01) |
| B01J 23/648 | (2006.01) |
| B01J 23/652 | (2006.01) |
| B01J 23/656 | (2006.01) |
| B01J 23/68 | (2006.01) |
| B01J 23/745 | (2006.01) |
| B01J 23/847 | (2006.01) |
| B01J 23/881 | (2006.01) |
| B01J 23/887 | (2006.01) |
| B01J 23/888 | (2006.01) |
| B01J 23/889 | (2006.01) |
| B01J 23/89 | (2006.01) |
| B01J 35/00 | (2006.01) |
| B01J 35/10 | (2006.01) |
| B01D 53/94 | (2006.01) |
| B01J 21/04 | (2006.01) |

(52) U.S. Cl.
CPC ....... *B01D 53/945* (2013.01); *B01D 53/9422* (2013.01); *B01J 21/04* (2013.01); *B01J 23/6484* (2013.01); *B01J 35/1014* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/206* (2013.01); *B01D 2255/2073* (2013.01); *B01D 2255/20723* (2013.01); *B01D 2255/20738* (2013.01); *B01D 2255/20761* (2013.01); *B01D 2255/20776* (2013.01); *B01D 2255/40* (2013.01); *B01D 2255/908* (2013.01); *Y02T 10/22* (2013.01)

(58) Field of Classification Search
CPC ... B01J 23/40; B01J 23/42; B01J 23/44; B01J 23/48; B01J 23/50; B01J 23/52; B01J 23/6482; B01J 23/6484; B01J 23/6456; B01J 23/6525; B01J 23/6527; B01J 23/6562; B01J 23/682; B01J 23/685; B01J 23/686; B01J 23/687; B01J 23/688; B01J 23/745; B01J 23/8472; B01J 23/8474; B01J 23/8476; B01J 23/881; B01J 23/8877; B01J 23/888; B01J 23/8885; B01J 23/8892; B01J 23/8906; B01J 35/0006; B01J 35/1014; B01J 21/00; B01D 35/945; B01D 53/945
See application file for complete search history.

(56) References Cited

U.S. PATENT DOCUMENTS

| | | | | |
|---|---|---|---|---|
| 5,055,440 A * | 10/1991 | Chu | ............. | B01D 53/945 502/303 |
| 5,093,301 A * | 3/1992 | Chu | ............. | B01D 53/945 502/303 |
| 5,502,019 A * | 3/1996 | Augustine | ......... | B01D 53/8668 502/183 |
| 6,103,207 A * | 8/2000 | Chattha | ............ | B01D 53/945 423/213.2 |
| 6,172,000 B1 * | 1/2001 | Chattha | ............ | B01D 53/945 502/324 |
| 6,468,941 B1 | 10/2002 | Bortun et al. | | |
| 6,585,944 B1 | 7/2003 | Nunan et al. | | |
| 6,638,486 B2 * | 10/2003 | Masaki | ............ | B01D 53/8628 423/213.2 |
| 6,680,036 B1 * | 1/2004 | Fisher | ............. | B01D 53/945 423/213.2 |
| 6,855,661 B2 * | 2/2005 | Kim | ............. | B01D 53/945 502/216 |
| 6,861,387 B2 * | 3/2005 | Ruth | ............. | B01J 21/18 502/184 |
| 6,884,402 B2 * | 4/2005 | Masaki | ............ | B01D 53/8628 423/213.2 |
| 7,109,145 B2 * | 9/2006 | Ruth | ............. | B01J 21/18 429/483 |
| 7,166,263 B2 * | 1/2007 | Vanderspurt | ......... | B01J 23/002 423/263 |
| 7,202,194 B2 * | 4/2007 | Muhammed | ........ | B01D 53/945 502/304 |
| 7,329,627 B2 * | 2/2008 | Wanninger | ......... | B01D 53/864 502/304 |
| 7,612,011 B2 * | 11/2009 | Vanderspurt | ......... | B01J 23/002 502/302 |
| 7,825,065 B2 | 11/2010 | Ito et al. | | |
| 7,943,104 B2 | 5/2011 | Kozlov et al. | | |
| 7,968,492 B2 * | 6/2011 | Augustine | ......... | B01D 53/9418 423/239.1 |
| 8,454,917 B2 | 6/2013 | Hoyer et al. | | |
| 8,530,372 B2 * | 9/2013 | Luo | ............. | B01D 53/945 502/303 |
| 8,673,809 B2 * | 3/2014 | Nakatsuji | ............ | B01D 53/945 502/302 |
| 8,959,894 B2 * | 2/2015 | Qi | ............. | B01D 53/9422 60/286 |
| 9,012,353 B2 * | 4/2015 | Golden | ............. | F01N 3/101 502/258 |
| 9,114,385 B2 * | 8/2015 | Brisley | ............ | B01D 53/9422 |
| 9,352,303 B2 * | 5/2016 | Chang | ............. | B01D 53/9418 |
| 9,573,097 B2 * | 2/2017 | Reichinger | ........ | B01D 53/9404 |
| 2005/0282698 A1 | 12/2005 | Southward et al. | | |
| 2010/0135879 A1 | 6/2010 | Roesch et al. | | |
| 2012/0040824 A1 | 2/2012 | Itou et al. | | |
| 2014/0018235 A1 | 1/2014 | Ito et al. | | |
| 2017/0021340 A1 | 1/2017 | Hofmann et al. | | |

FOREIGN PATENT DOCUMENTS

| | | |
|---|---|---|
| EP | 2216087 A1 | 8/2010 |
| JP | 2005125317 A | 5/2005 |
| JP | 2006-239642 A | 9/2006 |
| JP | 2007-136339 A | 6/2007 |
| JP | 2007203160 A | 8/2007 |
| WO | 97/23278 A1 | 7/1997 |
| WO | 99/34904 A1 | 7/1999 |
| WO | 00/03790 A1 | 1/2000 |
| WO | 02/40151 A1 | 5/2002 |
| WO | 2008113445 A1 | 9/2008 |
| WO | 2010/096612 A2 | 8/2010 |
| WO | 2011/109676 A2 | 9/2011 |
| WO | 2012/133526 A1 | 10/2012 |

OTHER PUBLICATIONS

Wilhelm Keim. Catalysis in Environmental Protection. Handbook of Heterogeneous Catalysis, $2^{nd}$ Edition, (2008), 2265-2274.

Bergner, et al. $VNB_gO_{25}$-δ-Synthesis, electrical conducting behavior and density functional theory (DFT) calculation. Journal of Solid State Chemistry, 182 (2009), 2053-2060.

Börrnert, et al. Temperature-dependent oxygen release, intercalation behavior and catalytic properties of $V_2O_5$·$^xNb_2O_5$ compounds. Materials Research Bulletin, 46, (2011), 1955-1962.

(56) References Cited

OTHER PUBLICATIONS

Christian-Hagelüken. Autoabgaskatalysatoren. Kontakt and Studium, 612, (2001), 48-51 &74-79.
Geus, et al. Preparation of Supported Catalysts by Deposition Precipitation. (1999), 460-487.
Heck, et al. Toward a Zero-Emission Stoichiometric Spark-Ignited Vehicle. Catalytic Air Pollution Control Commercial Technology. Wiley & Sons, Inc., Publication. (2009), 148-157.
International Search Report for PCT/EP2014/075552, dated Feb. 19, 2015 in English Language.
Written Opinion of the International Searching Authority for PCT/EP2014/075552, dated Feb. 19, 2015 in English Language.
Lewandowska, et al. In Situ TPR/TPO-Raman studies of dispersed and nano-scaled mixed V-Nb oxides on alumina. Catalysis Today, 118, (2006) 323-331.
International Preliminary Report on Patentability for PCT/EP2014/075572 dated May 31, 2016 (7 pages).
International Search Report for PCT/EP2014/075572, dated Feb. 19, 2015 in English Language.
Written Opinion of the International Searching Authority for PCT/EP2014/075572, dated Feb. 19, 2015 in English Language.
Office Action dated Feb. 5, 2018 in Chinese Patent Application No. 201480064837.0 (11 pages in Chinese with English translation).
Chinese Search Report dated Jan. 26, 2018 in Chinese Patent Application No. 201480064837.0 (4 pages in Chinese with English translation).
Office Action dated May 29, 2018 in Japanese Patent Application No. 2016-535127 (4 pages in Japanese with English translation).

* cited by examiner

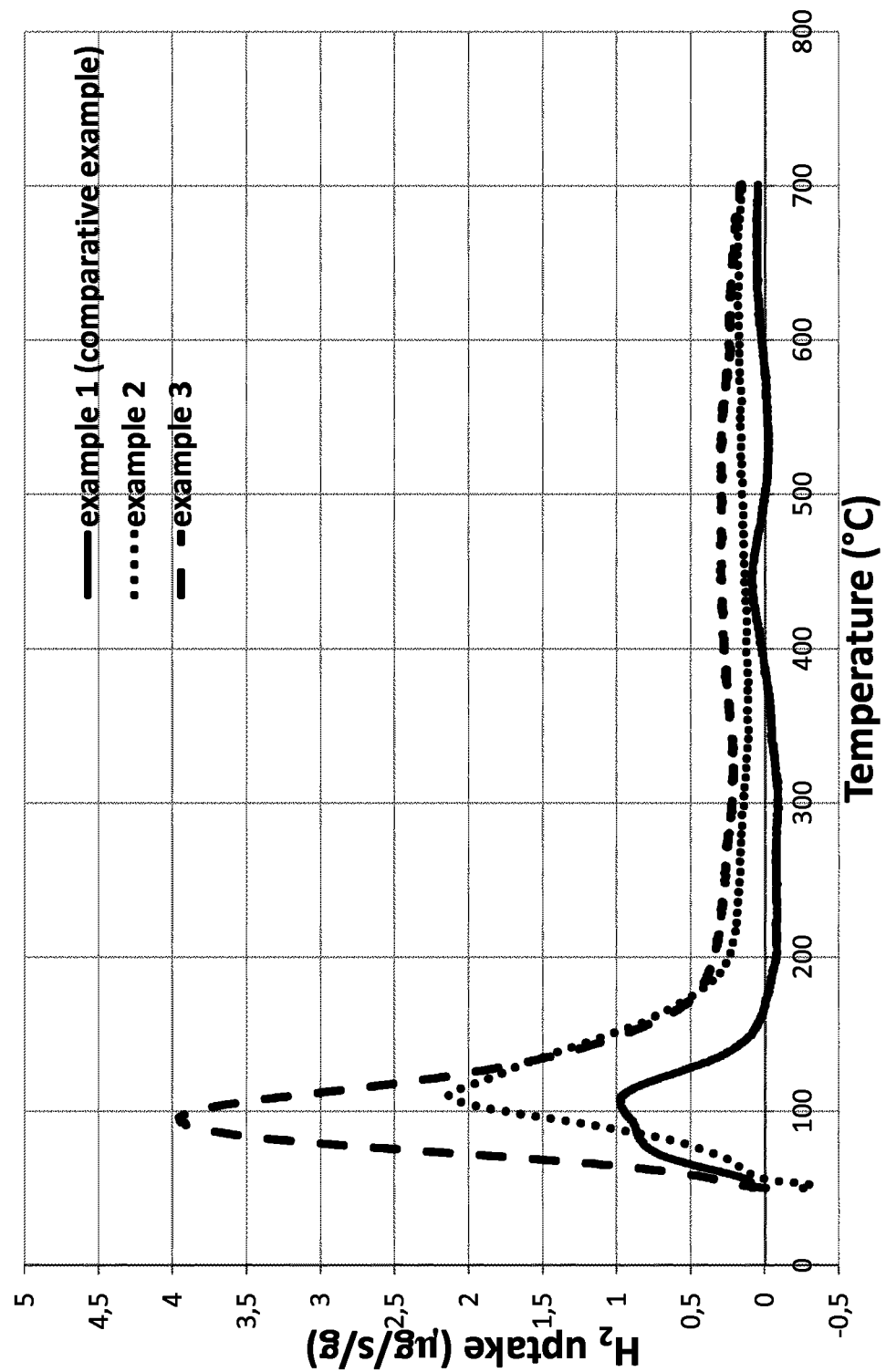

OXYGEN STORAGE MATERIALS

The present invention is concerned with oxygen storage materials. In particular, an oxygen storage material (OSM) is proposed which comprises a certain mixed oxide as the oxygen storage component (OSC). The oxygen storage material can be used in a conventional manner in three-way catalysts, oxidation catalysts or NOx-storage catalysts for example.

Exhaust gases from internal combustion engines operated with a predominantly stoichiometric air/fuel mixture, like e.g. port-fuel injection (PFI) or gasoline direct injected (GDI) engines with and without turbocharger, are cleaned according to conventional methods with the aid of three-way catalytic (TWC) converters. These are capable of converting the three essentially gaseous pollutants of the engine, specifically hydrocarbons (HC), carbon monoxide (CO), and nitrogen oxides (NOx), simultaneously to harmless components.

Optimal use of the TWC is around Lambda=1 where the air/fuel ratio is equal to 14.56 or simply $\lambda=1$. Above these values, the exhaust gas is said lean, and CO and HC are catalytically oxidized to carbon dioxide and water. Below this value, the exhaust gas is said rich and mainly NOx are reduced to nitrogen ($N_2$) using e.g. CO as reducing agent. However, the upcoming more stringent governmental emission regulations (e.g. EU-6—table 1, LEV-III) and fuel economy standards ($CO_2$ regulations) will of course make exhaust aftertreatment even more difficult in the future (table 1).

TABLE 1

Euro 6 emission limits for passenger cars

|  |  | compression ignition vehicles | spark ignition vehicles |
|---|---|---|---|
| THC | mg/km | n.a. | 100 |
| NMHC | mg/km | n.a. | 68 |
| HC + NOx | mg/km | 170 | n.a. |
| NOx | mg/km | 80 | 60 |
| CO | mg/km | 500 | 1000 |
| particle mass | mg/km | 4.5 | 4.5 |
| particle number | #/km | $6.0 \times 10^{11}$ | TBD |

Hence, also for gasoline vehicles, which predominantly run under stoichiometric conditions (A/F-ratio=14.56 or $\lambda=1$), there is still a need to further improve the ability to mitigate noxious pollutants.

As said, optimal conversion of HC, CO and NOx over a TWC is achieved at $\lambda=1$. However, gasoline engines are operated under oscillating conditions between slightly lean and slightly rich conditions ($\lambda=1\pm0.05 =>$wobbling). Under purely rich conditions, the conversion of hydrocarbon drops rapidly. Under lean conditions NOx is converted less efficiently. In order to broaden the optimal operation range of a TWC, an oxygen storage material (OSM), is included in the formulation of the TWC.

The OSM referred to above are typically based upon mixed oxides of $CeO_2/ZrO_2$ (WO2008113445A1; U.S. Pat. No. 7,943,104BB) and are solid electrolytes known for their oxygen ion conductivity characteristic. In these OSM the $CeO_2$ is employed to buffer the catalyst from local variations in the air/fuel ratio during typical catalyst operation. They do this by 'releasing' active oxygen from their 3-D structure in a rapid and reproducible manner under oxygen-depleted transients, 'regenerating' this lost oxygen by adsorption from the gaseous phase under oxygen-rich conditions. This activity is attributed to the reducibility (reduction—oxidation or redox activity) of $CeO_2$ via the $2Ce^{4+} \rightarrow 2Ce^{3+}$ [$O_2$] reaction. This high availability of oxygen is critical for the promotion of generic oxidation/reduction chemistries e.g. CO/NO chemistry for the gasoline three-way catalyst, or more recently also for the direct catalytic oxidation of particulate matter (soot) in the EDPF e.g. US20050282698 A1, SAE 2008-01-0481.

Hence there have been extensive studies on the chemistry, synthesis, modification and optimization of regularly used Ce—Zr based OS materials. For example, the use of Ceria-Zirconia materials doped with lower valent ions for emission control applications have been extensively studied e.g. U.S. Pat. No. 6,468,941, U.S. Pat. No. 6,585,944 and US20050282698A1. These studies demonstrate that lower valent dopant ions such as Rare Earth metals e.g. Y, La, Nd, Pr, etc., Transition metals e.g. Fe, Co, Cu etc. or Alkaline Earth metals e.g. Sr, Ca, Mg and Ba can all have a beneficial impact upon oxygen ion conductivity. This is proposed to arise from the formation of oxygen vacancies within the cubic lattice of the solid solution which lowers the energy barrier to oxygen ion transport from the crystal bulk to the surface thereby enhancing the ability of the solid solution to buffer the air fuel transients occurring in the exhaust stream of a typical gasoline (three-way) catalyst application.

Finally U.S. Pat. No. 6,468,941 and U.S. Pat. No. 6,585,944 teach the potential for employing base i.e. non-precious group (Pt, Pd, Rh, Au etc.) dopant metals into the Cubic Fluorite lattice of the solid solution as an alternative means to promote the redox chemistry of Ce, with Fe, Ni, Co, Cu, Ag, Mn, Bi and mixtures of these elements being identified as of particular interest. Hence, while normal non-promoted OSM typically exhibit a redox maximum, as determined by $H_2$ Temperature Programmed Reduction ($H_2$-TPR), at ca. 600° C., the inclusion of base metals within the lattice can decrease this temperature by >200° C. at a fraction of the cost incurred by the use of precious metals.

U.S. Pat. No. 6,585,944 discloses an OSM comprising besides zirconium, cerium, and a rare earth metal as a stabilizer, 0.01 to 0.25 mol-% of at least one kind of metal selected from a group consisting of iron, copper, cobalt, nickel, silver, manganese, and bismuth. And, the literature describes that these metals exist as a solid solution in a crystal structure of the OSM.

In addition, JP2005125317A discloses an OSM comprising a carrier containing ceria ($CeO_2$) and iron oxide as an active species contained in said carrier. The literature describes that the carrier containing $CeO_2$ is preferably a solid solution of $CeO_2$—$ZrO_2$. Further, it is mentioned that the content of iron oxide is desirably in a range of 2 to 30% by weight as $Fe_2O_3$ relative to the weight of the OSM, and substantial OSM cannot be obtained when the content deviates from this range.

There have been attempts to produce ceria free oxygen storage components (WO10096612A2). For example, WO2011109676A2 refers to ceria-free oxygen storage components, like e.g. zirconia-praseodymia, zirconia-neodymia, zirconia-yttria and zirconia-lanthana. Nevertheless, still a need exist for more or alternative OSM not only because the Rare Earth crisis told that reliance on $CeO_2$ only may lead to shortcomings in supply of TWC and other catalysts needed in the market.

Hence, it is an objective of the present invention to propose new materials that are able to substitute the $CeO_2$—$ZrO_2$ mixed oxides in oxygen storage materials. It is further an object to present materials in this regard which are at least as efficient in oxygen storage behavior as Ce-based oxides. Naturally, this objective should be accomplished by less expensive materials.

These objectives as well as others being easily derived from the prior art by the artisan are achieved by a material according to the present invention. Preferred aspects of the present invention are discussed herein. Further embodiments of the present invention refer to certain types of catalysts, a respective exhaust treatment system and a process for treating exhaust gases.

Factually, the present invention suggests a catalytic oxygen storage material comprising a catalytically active metal selected from the group consisting of Cu, Ag, Au, Pt, Pd, Rh, Ru, Ir and mixtures thereof and further a binary, ternary or higher mixed oxide as the oxygen storage component (OSC), which is of the formula $$(M1)_a(M2)_b(M3)_c \ldots (M7)_g O_x$$

wherein $0 \leq a, b, c, \ldots, g \leq 20$ with at least a and $b > 0$; and x adapts a value to compensate the positive charge originating from the metal cations M1-M7 being selected from the group consisting of Fe, Mn, V, Nb, Ta, Mo, and W and wherein the oxide is supported on a high surface area refractory metal oxide support having a surface area of at least 50 m$^2$/g. These materials are active oxygen storage materials being able to store oxygen not much less efficiently than conventional Ce-based oxygen storage materials but for the advantage of higher relative and absolute oxygen storage capacity. The materials of the invention are able to substitute the Ce-based oxygen storage material in normal TWC or other catalyst types without further measures to be taken. Hence, it is possible to omit the costly Ce-based oxygen storage material completely and produce catalysts with Ce-free oxygen storage materials. In a preferred aspect of the invention, the OSM does not comprise any Ce-compound.

For an advantageous use the present material comprises catalytically active metals which serve for the activation of a fast oxygen storage and release. Whereas the precious metal free oxygen storage materials in H2-TPR only show reducibility at elevated temperatures, the physical addition of catalytically active precious metals activate the oxygen atoms of said oxygen storage materials so that respectively loaded samples release oxygen at temperatures well below 200° C. already.

Useful catalytically active metals include at least one of the active precious metals, like Cu, Ag, Au, Pt, Pd, Rh, Ru, Ir, with platinum, palladium and/or rhodium being preferred. These catalytic metals are typically used in amounts of about >0 to about 14 g/l (400 g/ft$^3$), preferably from 0.1-8.8 g/l (3 to 250 g/ft$^3$), most preferred between 0.35-7 g/l (10-200 g/ft$^3$), depending on the respective metal applied. Amounts of platinum group metal components are based on weight divided by carrier volume, and are typically expressed in grams of material per liter carrier volume.

With regard to Pd an amount of from 0.0-300 g/l, preferably 0.1-100 g/l and most preferred 0.5-14 g/l is applied. Pt may be present in an amount of from 0.1-50 g/l, preferably, 0.5-20 g/l and most preferred 1.0-7 g/l. Rh can be comprised from 0.0-1.0 g/l, preferably 0.01-0.7 g/l and most preferred 0.1-0.5 g/l.

As will be apparent to those of ordinary skill in the art, the active precious metals, acting as catalytic agents, can exist in the catalyst in multiple oxidation states while in use. By way of example, palladium can exist as palladium metal (0), Pd (II), and Pd (IV) in the catalyst. In a preferred method of preparing the OSM, a suitable precious metal compound and/or complex of the active precious metal can be utilized to achieve dispersion of the precious metal on the oxygen storage component and/or on a support, e.g., activated alumina support particles (see below). As used herein, the term "precious metal compound" means any precious metal compound, complex, or the like which, upon calcination or use of the catalyst decomposes or otherwise converts to a catalytically active form, usually, the metal itself or the metal oxide. Hence, compounds or complexes of said precious metals soluble or dispersible in a liquid, preferably water, can be utilized as long as the liquid used to impregnate or deposit the catalytic metal compounds onto the oxygen storage component and/or onto the support particles does not adversely react with the catalytic precious metal or its compound or complex or the other components of the oxygen storage material and is capable of being removed from the catalyst by volatilization or decomposition upon heating and/or the application of vacuum.

In some cases, the completion of removal of the liquid may not take place until the catalyst is placed into use and subjected to the high temperatures encountered during operation. Generally, both from the point of view of economics and environmental aspects, aqueous solutions of soluble compounds of the active precious metals are preferred. For example, suitable compounds are chloroplatinic acid, amine solubilized platinum hydroxide, platinum nitrate, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the active precious metal or a compound thereof.

Useful catalytic supports for the active precious metal components and the binary, ternary or higher mixed oxides having oxygen storage capacity include any of the refractory metal oxides usually taken for this exercise, such as one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. Preferably, the support is substantially comprised of alumina which preferably includes the members of the gamma or activated alumina family, such as gamma, alpha, delta, eta and/or theta aluminas, and, if present, a minor amount of other refractory oxides, e.g., about up to 20 weight percent, preferably up to 10 weight percent of support material. Preferably, the support comprises γ-alumina. The support material is providing a BET specific surface area of about 50 to about 400, preferably 80 to 350 and most preferred 100 to 300 m$^2$/g.

The use of mixed oxide components in OSM according to the invention is directed to certain binary, ternary or higher mixed oxides which are capable of storing oxygen.

It has turned out that said materials are in particular useful for oxidation and reduction depending on the partial pressure of oxygen in the ambient exhaust, especially in automotive applications. Comparable to the oxygen storage mechanism as observed in CeO$_2$ based materials (Wilhelm Keim, in Handbook of Heterogeneous Catalysis, 2$^{nd}$ Edition, Chapt 11, Vol 5, page 2295), the activity of the binary or ternary or higher mixed oxides described in this document is attributed to the reducibility of at least one of the elements used in the mixed oxides with simultaneous oxygen release under oxygen depleted conditions and the reversibility of this reaction when the environment is oxygen rich (see also Holleman Wiberg, 101. Edition; Bergner et al. J. Solid State Chem. 182 (2009) 2053; Börrnert et al. Materials Research Bulletin 46 (2011) 1955). The advantage of the elements used herein is their wealth on oxidation states and hence a large possibility to show redox properties. In the case of Vanadium containing mixed oxides for example, a stepwise reduction of V(V) to V(II) under release of $O_2$ might be considered.

In general the oxygen release reaction can be described as follows:

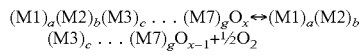

$$(M1)_a(M2)_b(M3)_c \ldots (M7)_g O_x \leftrightarrow (M1)_a(M2)_b (M3)_c \ldots (M7)_g O_{x-1} + \tfrac{1}{2} O_2$$

In a preferred aspect of the present invention an oxygen storage material is proposed which uses OSC for exhaust catalysis in which for the OSC the values for a are in the molar range of ≥0-20, preferably 1-20 and most preferred between 1-16. Likewise the values for b are in the range of from ≥0-20, preferably 1-20 and most preferred between 1-17. In addition the values for c may be in the range of 0-5, preferably 0-2 and most preferred from 0-1 and d-g may be in the range of 0-5, preferably 0-2 and most preferred from 0-1. A very preferred oxygen storage material shows values of a-g, wherein a is from 1-16, b is from 1-17, c is from 0-1 and d, e, f, g is from 0-1 for the OSC. An extremely preferred component used in the OSM is one having a=1 and b=1, in which M1 and M2 are selected from the group of Fe, V, Mn and c-g are 0.

The oxygen storage capacity of the materials according to the present invention is established through a mixed oxide of above mentioned components. The transition metals can be selected according to the knowledge of the skilled worker among the group of metals presented by the group consisting of Fe, Mn, V, Nb, Ta, Mo and W. In a preferred embodiment only 5 metals (M1-M5) are taken to build up the oxygen storage component of the OSM, the metals being taken from the group consisting of Fe, Mn, V, Nb and W. In a very preferred aspect the oxygen storage material according to the invention is proposed, wherein M1-M2 are selected from the group consisting of Fe, Mn, V. It should well be understood that the oxygen storage component, i.e. the component establishing the oxygen storage capability, is free of any ceria or mixed oxides containing ceria. In a most preferred embodiment, however, the oxygen storage material, i.e. the oxygen storage component plus the catalytically active precious group metals plus the support material, does not comprise any ceria or mixed oxides containing ceria.

Any kind of water soluble precursor of the metals (M1-M7) might be used by the skilled worker. Most preferred are iron acetate, iron nitrate, manganese acetate, manganese nitrate, vanadyloxalate, ammoniummetavanadate, ammoniumniobiumoxalate, tantalumoxalate, ammoniummolybdate and/or ammoniummetatungstate. Alternatively the oxides, the oxohydroxides and/or the hydroxides of the metals (M1-M7) might be used as precursor for the preparation of the oxygen storage components. In any case, the precursor has to be chosen by the skilled worker in such a way that the oxygen storage material described in this invention is obtained after thermal treatment of the precursor of the oxygen storage materials.

An oxygen storage material as understood in the present invention can store oxygen to a certain extent under conditions prevailing in the exhaust of an internal combustion engine. The material of the invention is able to store the oxygen from the ambient exhaust gas to an extent of preferably at least 8.000 µg $O_2$/mmol oxygen storage component. In a more preferred aspect the present invention provides for an oxygen storage material which is able to store the oxygen at level of at least 10.000, most preferred over 12.000 µg $O_2$/mmol oxygen storage component.

Further, the oxygen storage material of the present invention is able to be oxidized and reduced in $H_2$-TPR experiments within a temperature range of from 20°-650° C., preferably 20°-350° C. and most preferred 20°-200° C. It is to be noted that a good oxygen storage material is having a peak temperature of reduction within below 150° C. and most preferred below 100° C. It should also be stressed that the material has a high resistance against aging. Under hydrothermal redox aging [6 h 1000° C., 1 min 1% CO, 1 min 1% $O_2$, 10% $H_2O$, balance $N_2$] the material loses less than 67%, preferably less than 50% and most preferably less than 33% of the oxygen storage capacity (both relative as well as absolute).

In a next embodiment the present invention is directed to certain catalysts which comprise the oxygen storage material according to the present invention. The types of catalysts which come into consideration in this respect are three-way catalysts (TWC), oxidation catalysts or NOx-storage catalysts. The skilled worker in the art is very well equipped with the knowledge of these types of catalysts and how they work. Reference is made to the books Auto-abgaskatalysatoren by Christian Hagelüken, Expert Verlag, 2005, 2. Edition and Catalytic Air Pollution Control by Ronald M. Heck et al., John Wiley & Sons, Inc., 1995 for basic information in this regard. Likewise the just mentioned catalysts may be built into an exhaust treatment system for combustion engines with a predominantly stoichiometric air/fuel mixture using three-way catalytic (TWC) converters which is able to mitigate the noxious pollutants of the exhaust in a very preferred way, e.g. TWC plus GPF (gasoline particle filter). On the other hand, also exhaust from lean combustion engines may be treated with catalysts comprising oxygen storage materials of the present invention. Said catalyst types, like NOx storage catalysts, cDPFs (catalytic diesel particulate filter), HC-traps, DOCs (diesel oxidation catalysts) may be part of an aftertreatment system comprising further exhaust aftertreatment units like SCR-catalyst, cDPF, DOC, NOx storage catalysts comprising no OSM of the present invention. Preferably, a system is chosen which comprises a DOC followed by a cDPF comprising the oxygen storage material of the invention again followed by an SCR-catalyst with an injection means for a urea or an $NH_3$ precursor between the cDPF and SCR-catalyst.

In a last embodiment the present invention is directed to a process for treating exhaust gas from combustion engines, wherein the exhaust gas is brought into contact with one or more of the catalysts of the invention or the just mentioned aftertreatment systems under conditions effective to mitigate noxious pollutants in the exhaust. It is well understood that the preferred aspects and embodiments mentioned for the oxygen storage material are also applicable to the catalysts, the exhaust treatment system and the process presented here.

The preparation of the oxygen storage materials described in this invention is as known by the skilled worker. The oxygen storage material comprises an active precious metal, a binary, ternary or higher mixed oxide (i.e. the oxygen storage component) and a supporting oxide.

Typically, the oxygen storage component is prepared by the formation of a preferably aqueous solution containing all precursor of the oxygen storage component. As precursor the above described chemical compounds might be used, but this invention is not limited to the above depicted compounds.

If present in dissolved form the oxygen storage component might be formed by precipitation out of the solution containing the mixture of the precursors of the oxygen storage components, or by evaporation of the solvent. Alternatively, the preferably aqueous solution containing the precursors of the oxygen storage component might be added to the supporting oxide by pore volume impregnation, i.e. incipient wetness impregnation (see: J. W. Geus in *Preparation of solid Catalysts* Wiley VCH (1999), Chapt. 4, Page 464) or by spraying the solution containing the oxygen storage component precursor or the dispersion containing the oxygen storage component on a slurry containing the supporting oxide. The final oxygen storage component is obtained as an oxide by thermal treatment of the materials obtained by the preparation methods above.

The precious metal precursor might be added to the solution containing the oxygen storage component precursors or to the dispersion containing the oxygen storage component. Alternatively, the precious metal precursor is added in a next preparation step to the already formed oxygen storage component obtained by the methods described above. Again, the addition of the precious metal precursor is as known by the skilled worker. Preferably, an aqueous solution of the precious metal precursor is added to the oxygen storage component or to the mixture of the oxygen storage component and the supporting oxide by pore volume impregnation or by spraying the precious metal containing solution on a slurry containing the oxygen storage component or on the mixture of the oxygen storage component and the supporting oxide.

In a very preferred way of preparing the oxygen storage material, an aqueous solution containing the precursor of the oxygen storage component is added to the supporting oxide by pore volume impregnation, followed by drying and calcination of the mixture. In a second step, the precious metal precursor is added by pore volume impregnation on the calcined mixture of the oxygen storage component and the supporting oxide. The precious metal precursor is converted to the active precious metal as described above.

The present invention deals with alternative $CeO_2$ free materials having oxygen storage capacity and their use in exhaust, in particular automotive exhaust catalysis. The materials are characterized by a high specific surface area, a low temperature activation of reduction, a high relative oxygen storage capacity as well as a high absolute oxygen storage capacity compared to $CeO_2$ containing reference material.

To determine activity of the oxygen storage components and materials based on the oxygen storage components $H_2$-TPR experiments are carried out. Therefore, a powder sample of the oxygen storage material is heated under a $H_2$ flow and the uptake of $H_2$ as a function of the temperature is monitored.

The temperature with the maximum $H_2$ uptake (i.e. the peak temperature) is a measure for the oxygen release speed. As described above, the materials being part of this invention are characterized by a low peak temperature.

The relative oxygen storage capacity is defined as the amount $H_2$ actually consumed by the oxygen storage component relative to the maximum amount $H_2$ needed for a reduction of the oxygen storage component and is given in %. This relative oxygen storage capacity is a measure for the degree of reducibility of the sample.

As the oxygen storage components being part of the oxygen storage materials described in this invention might show quite different values for their molecular weight, a comparison of the $H_2$ uptake relative to the molar amount of oxygen storage component makes sense. This value is defined as the absolute hydrogen uptake capacity and is given in µg $H_2$/mmol component. Since the $H_2$ uptake is a measure for the amount of $O_2$ released by the component because of the following chemical reaction

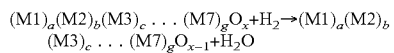

the absolute oxygen storage capacity in µg $O_2$/mmol component can be calculated from the absolute hydrogen uptake per mmol component.

In FIG. 1 the $H_2$-TPR measurements for two oxygen storage materials described in this invention are given. For the comparative example a 1 w % Pd/10 w % $CeO_2$ on $Al_2O_3$ similarly prepared like the materials of this invention is given. The advantage of claimed oxygen storage materials can clearly be seen.

Due to the presence of the precious metal, a low temperature activation of the reducibility of all materials is observed, which is shown in a low peak temperature in the $H_2$-TPR measurements. Nevertheless, the materials described in this invention typically show a peak temperature lower as observed for the comparative example which is a $CeO_2$ containing material. In the case of the $FeVO_4$ system, the peak temperature is observed at 95° C., which is 12° C. lower as the reference system containing $CeO_2$.

The relative oxygen storage capacity is much higher for the oxygen storage materials disclosed in this invention compared to the comparative $CeO_2$ containing sample. In the case of the $VNbO_5$ system a relative oxygen storage capacity of 81% is observed for the temperature range from room temperature up to 700° C., whereas the $CeO_2$ reference material shows a relative oxygen storage capacity of only 31% for the same temperature range. In addition, other materials that are part of this invention show a higher relative oxygen storage capacity compared to the comparative example (e.g. the $FeVO_4$ system shows a relative oxygen storage capacity of 68%)

Similar results are observed for the absolute hydrogen uptake capacity. The oxygen storage materials being part of this invention show a much higher absolute hydrogen uptake capacity in µg $H_2$/mmol oxygen storage component as the comparative $CeO_2$ sample. Whereas the absolute hydrogen uptake capacity in µg $H_2$/mmol for the $FeVO_4$ system is 2048 µg $H_2$/mmol oxygen storage component for the temperature range from room temperature up to 700° C., the $CeO_2$ sample shows in the same temperature range a $H_2$ uptake of only 306 µg $H_2$/mmol $CeO_2$.

As the absolute oxygen storage capacity is calculated from the absolute hydrogen uptake capacity, it is clear that the oxygen storage materials disclosed in this invention show a significantly higher absolute oxygen storage capacity compared to the reference sample. The $FeVO_4$ sample shows a $O_2$ storage capacity of 16384 µg $O_2$/mmol component, which is significantly higher as the comparative example (i.e. 2448 µg $O_2$/mmol component).

According to the above said the components and materials presented herein are fairly deemed to substitute ceria and mixed oxides containing ceria in so called oxygen storage components and respective materials. It has hitherto not been made available to the public that said components and materials may exhibit such superior capabilities. Hence, it is correct to say that it is rather a surprise that instant components and materials may serve as advantageous compartments of catalysts, in particular exhaust catalysts, especially in the automotive area.

EXAMPLES

Example 1

1 w % Pd/10 w % $CeO_2$ on $Al_2O_3$ (Comparative Sample)

Preparation/Calcination

The catalyst material was prepared by pore volume impregnation of a $Al_2O_3$ powder with a mixture of an aqueous solution of Pd(NO$_3$)$_2$ and (NH$_4$)$_2$Ce(NO$_3$)$_6$. After drying, the sample was calcined in static air for 4 h at 700° C.

Example 2

1 w % Pd/10 w % VNbO$_5$ on Al$_2$O$_3$

The catalyst material was prepared by pore volume impregnation of a Al$_2$O$_3$ powder with a mixture of an aqueous solution of Pd(NO$_3$)$_2$, Vanadyloxalate and Ammonium Niobium oxalate. After drying, the sample was calcined in static air for 4 h at 700° C.

Example 3

1 w % Pd/10 w % FeVO$_4$ supported on Al$_2$O$_3$

The catalyst material was prepared by pore volume impregnation of a Al$_2$O$_3$ powder with a mixture of an aqueous solution of Pd(NO$_3$)$_2$, Vanadyloxalate and Iron nitrate. After drying, the sample was calcined in static air for 4 h at 700° C.

Referring to FIG. 1 and Table 2 the redox activity characteristics are compared for the samples 1 w % Pd/10 w % CeO$_2$ on Al$_2$O$_3$ (comparative example), 1 w % Pd/10 w % VNbO$_5$ on Al$_2$O$_3$ and 1 w % Pd/10 w % FeVO$_4$ supported on Al$_2$O$_3$. It is seen that the oxygen storage materials described in this patent show enhanced properties compared to the reference material containing CeO$_2$. This is further demonstrated in Table 2 where the maxima in reduction temperatures are recorded as well as the relative oxygen storage capacity (in %), the absolute hydrogen uptake capacity (in μg H$_2$/mmol oxygen storage component), and the absolute oxygen storage capacity (in μg O$_2$/mmol oxygen storage component).

TABLE 2

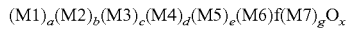

| Material | H$_2$ TPR Peak position, ° C. | relative oxygen storage capacity (%); RT - 700° C. | absolute hydrogen uptake capacity (μg H$_2$/mmol oxygen storage component); RT - 700° C. | absolute oxygen storage capacity (μg O$_2$/mmol oxygen storage component); RT - 700° C. | Redox reaction |
|---|---|---|---|---|---|
| Example 1 (comparative example) | 107 | 31 | 306 | 2448 | CeO$_2$ → Ce$_2$O$_3$ +IV → +III |
| Example 2 | 109 | 81 | 1617 | 12936 | VNbO$_5$ → VNbO$_3$ +V/+V → +III/+III |
| Example 3 | 95 | 68 | 2048 | 16384 | FeVO$_4$ → Fe$_2$V$_2$O$_5$ +III/+V → +II/+III | further a binary, ternary or higher mixed oxide consisting of the formula (M1)$_a$(M2)$_b$(M3)$_c$(M4)$_d$(M5)$_e$(M6)f(M7)$_g$O$_x$ wherein 0≤a, b, c, d, e, f, g≤20 and x adapts a value to compensate the positive charge originating from the metal cations M1-M7 being selected from the group consisting of Fe, Mn, V, W, Nb, Ta, and Mo; and wherein the mixed oxide is supported on a high surface area refractory metal oxide support having a surface area of at least 50 m$^2$/g.

2. Oxygen storage material according to claim 1, wherein a is from >0-20, b is from >0-20, c is from 0-5 and d, e, f, g is from 0-5.

3. Oxygen storage material according to claim 1, wherein M1-M5 are selected from the group consisting of Fe, Mn, V, Nb and W.

4. Oxygen storage material according to claim 1, wherein the storage capacity of the material is at least 8.000 μg O$_2$/mmol oxygen storage component.

5. Three-way catalyst, cDPF, oxidation catalyst or NOx-storage catalyst comprising the oxygen storage material according to claim 1.

6. Exhaust treatment system comprising one or more of the catalysts of claim 5.

The invention claimed is:

1. Catalytic oxygen storage material comprising a catalytically active metal selected from the group consisting of Cu, Ag, Au, Pt, Pd, Rh, Ru, Ir and mixtures thereof and 7. Process for treating exhaust gas from combustion engines, wherein the exhaust gas is brought into contact with one or more of the catalysts of claim 5 under conditions effective to mitigate noxious pollutants in the exhaust.

* * * * *